United States Patent [19]
Eguchi et al.

[11] Patent Number: 5,530,076
[45] Date of Patent: Jun. 25, 1996

[54] CURABLE ORGANOPOLYSILOXANE COMPOSITIONS

[75] Inventors: Katsuya Eguchi, Kanagawa, Japan; Toshio Suzuki, Midland, Mich.

[73] Assignee: Dow Corning Asia, Ltd., Tokyo, Japan

[21] Appl. No.: 403,994

[22] Filed: Mar. 14, 1995

[30] Foreign Application Priority Data

Mar. 16, 1994 [JP] Japan .................... 6-045925

[51] Int. Cl.⁶ .................... C08G 77/04
[52] U.S. Cl. .................... 525/478; 528/15; 528/31; 528/32; 524/588
[58] Field of Search .................... 525/478

[56] References Cited

U.S. PATENT DOCUMENTS

| | | | |
|---|---|---|---|
| 3,699,073 | 10/1972 | Wada et al. | 525/478 |
| 5,446,087 | 8/1995 | Chizat et al. | 524/588 |

FOREIGN PATENT DOCUMENTS

| | | |
|---|---|---|
| 0382338 | 8/1990 | European Pat. Off. . |
| 0565238 | 10/1993 | European Pat. Off. . |
| 0601938 | 6/1994 | European Pat. Off. . |

*Primary Examiner*—Ralph H. Dean
*Attorney, Agent, or Firm*—Patricia M. Scaduto; James E. Bittell

[57] ABSTRACT

The invention is a curable composition whose essential structural elements are M and Q units and which provides a cured product that has a flexural modulus capable of withstanding practical applications. The curable organopolysiloxane composition comprises (A) an alkenyl-functional organopolysiloxane whose main components are the $R^1_3SiO_{1/2}$ and $SiO_{4/2}$ units where $R^1$ represents monovalent organic groups, (B) an SiH-containing organopolysiloxane whose main components are the $R^2_3SiO_{1/2}$ and $SiO_{4/2}$ units where $R^2$ represents the hydrogen atom and monovalent organic groups and (C) a platinum catalyst. In addition, the composition exhibits a post-cure flexural modulus of at least 100 MPa.

7 Claims, No Drawings

CURABLE ORGANOPOLYSILOXANE COMPOSITIONS

The present invention relates to a novel curable organopolysiloxane composition.

The silicone industry uses the term "MQ resin" to designate organic solvent-soluble organopolysiloxanes composed of siloxane units in which three organic groups are bonded on silicon, $R_3SiO_{1/2}$ units, also known as M units and siloxane units free of organic groups, $SiO_{4/2}$ units, also known as Q units. MQ resin is used, for example, for pressure-sensitive adhesives, see Kunio Itoh (ed.), *Shirikon Handobukku [Silicone Handbook]*, Nikkan Kogyo Shinbunsha), Moreover, the use of functionalized MQ resin to reinforce silicone rubber by admixture with the corresponding straight-chain silicone gum has long been known.

However, no example has heretofore been reported of the preparation of a high modulus cured material by the hydrosilylation-mediated direct crosslinking of alkenyl-functional MQ resin with MQ resin containing silicon-bonded hydrogen (SiH).

The invention is a curable composition whose essential structural elements are the M and Q units and which provides a cured product that has a flexural modulus capable of withstanding practical service. More specifically, the present invention is a curable MQ resin composition that crosslinks by the hydrosilylation of an alkenyl group with an SiH group.

SUMMARY OF THE INVENTION

The present invention is a curable organopolysiloxane composition that comprises the following three essential components:

(A) a first organic solvent-soluble organopolysiloxane comprising $R^1_3SiO_{1/2}$ units and $SiO_{4/2}$ units where the sum of these units makes up at least 80 mole % of the first organopolysiloxane, each $R^1$ independently denotes a monovalent organic group and at least two of the $R^1_3SiO_{1/2}$ units in each molecule contains an alkenyl group having nor more than 10 carbons;

(B) a second organic solvent-soluble organopolysiloxane comprising $R^2_3SiO_{1/2}$ units and $SiO_{4/2}$ units where the sum of these units makes up at least 80 mole % of the second organopolysiloxane, each $R^2$ independently represents a hydrogen atom or a monovalent organic group and each molecule contains at least two $R^2_3SiO_{1/2}$ units in which at least one $R^2$ is hydrogen; and (C) a platinum catalyst.

DETAILED DESCRIPTION OF THE INVENTION

The first organic solvent-soluble organopolysiloxane is an alkenyl-functional MQ resin comprising $R^1_3SiO_{1/2}$ units and $SiO_{4/2}$ units where the sum of these units makes up at least 80 mole % of the instant component.

Each $R^1$ in the $R^1_3SiO_{1/2}$ unit is independently represented by a monovalent organic group. Said monovalent organic group is preferably a halogen-substituted or unsubstituted hydrocarbon group and more preferably is a halogen-substituted or unsubstituted $C_1$ to $C_{10}$ hydrocarbon group. $R^1$ is specifically exemplified by alkenyl groups such as vinyl, allyl, propenyl, butenyl, pentenyl and hexenyl; alkyl groups such as methyl, ethyl, propyl and butyl; aryl groups such as phenyl, tolyl, xylyl and mesityl; and haloalkyl groups such as chloromethyl and trifluoropropyl.

At least two $R^1_3SiO_{1/2}$ units in each molecule must contain an alkenyl group having no more than 10 carbons in order to obtain a good-quality crosslinked product. To produce a cured product having a particularly elevated property profile, each molecule preferably contains at least four $R^1_3SiO_{1/2}$ units containing an alkenyl group having no more than 10 carbons. There is no upper limit on the number of alkenyl-functional units and there are no impediments to all the $R^1_3SiO_{1/2}$ units bearing alkenyl.

The number of alkenyl groups in each $R^1_3SiO_{1/2}$ unit is not crucial, but each unit preferably contains one alkenyl group based on economic considerations. Economic considerations and ease of starting material acquisition make vinyl, allyl and hexenyl the preferred alkenyl groups and make methyl and phenyl the preferred non-alkenyl monovalent organic groups.

The sum of $R^1_3SiO_{1/2}$ units plus $SiO_{4/2}$ units must make up at least 80 mole % of the total constituent units in the present component, for a cured product with a satisfactory hardness is not produced at lower values. No particular restrictions apply to the constituent units which may be present in addition to $R^1_3SiO_{1/2}$ and $SiO_{4/2}$ units. Such units are exemplified by $R^3_2SiO$ and $R^3SiO_{1/2}$ units where $R^3$ represents monovalent organic groups and alkoxy groups. Said monovalent organic groups are exemplified by the same groups as provided above for $R^1$.

The proportions of $R^1_3SiO_{1/2}$ and $SiO_{4/2}$ units are not critical and should be selected in view of the required properties. For example, a high $SiO_{4/2}$ unit content should be used when a high molecular weight is required, while a high $R^1_3SiO_{1/2}$ unit content and a high content of alkenyl groups should be used when a high crosslink density is required. The $SiO_{4/2}$ unit-to-$R^1_3SiO_{1/2}$ unit ratio is preferably 0.3 to 3.0 and particularly good properties are obtained when this ratio is between 0.5 and 2.0.

The second organic solvent-soluble organopolysiloxane is an SiH-functional MQ resin comprising $R^2_3SiO_{1/2}$ units and $SiO_{4/2}$ units where the sum of these units makes up at least 80 mole % of the instant component.

Each $R^3$ in the $R^2_3SiO_{1/2}$ unit is independently represented by a monovalent organic group or a hydrogen atom. Also, each molecule contains at least two $R^2_3Sio_{1/2}$ units in which at least one $R^2$ is hydrogen.

This second organopolysiloxane reacts through its SiH groups with the alkenyl groups in the first organopolysiloxane to form a crosslinked product. Since the second organopolysiloxane may be thought of as the first organopolysiloxane where the alkenyl groups have been replaced by hydrogen, a detailed description of this second organopolysiloxane will be omitted.

The quantity of this second organopolysiloxane added is not critical; however, in order to obtain a high-quality cured product, the molar ratio of the total SiH in this component to the total alkenyl in the first organopolysiloxane preferably falls in the range of 1/5 to 5/1 and more preferably in the range of 1/3 to 3/1.

The platinum catalyst accelerates the curing reaction and encompasses those platinum catalysts known as hydrosilylation catalysts. This catalyst is not particularly critical as to type and it may be any platinum catalyst used in the usual hydrosilylation reactions or for addition-type silicone rubbers. Particularly suitable examples of this component are platinum chloride, chloroplatinic acid, platinum/olefin complexes, platinum/phosphine complexes, platinum/vinylsiloxane complexes and solutions of the preceding. While the quantity of platinum catalyst added is not specifically restricted, particularly suitable quantities will provide a molar ratio of 1/100,000 to 1/100 as platinum metal based on the total alkenyl in the first organopolysiloxane.

To develop satisfactory performance, the curable composition of the present invention needs to have a post-cure modulus of elasticity in flexure of at least 100 MPa. The conditions which produce a flexural modulus of at least 100 MPa cannot be rigorously specified, but important factors are the M unit/Q unit ratio, the alkenyl/SiH ratio, the curing temperature, the curing time, and so forth.

The curable composition according to the present invention may be cured simply by mixing the first and second organopolysiloxanes with the platinum catalyst; however, various additives may be introduced insofar as the object of the invention remains unimpaired. The following, for example, may be unproblematically introduced: acetylenic alcohols, amines, and phosphines, for the purpose of maintaining the pot life at room temperature; silica, diatomaceous earth, clay, talc, calcium carbonate, and various metal oxides, for the purpose of increasing the strength, hardness, or specific gravity of the cured product; and also carbon black, colorants, flame retardants, heat stabilizers.

EXAMPLES

The invention will be explained in greater detail below using working examples, in which "Me" indicates the methyl group and "Vi" indicates the vinyl group.

Example 1

50 g of an organopolysiloxane having an average molecular weight of 2,800 and the compositional formula $(ViMe_2SiO_{1/2})_{0.38}(SiO_2)_{0.62}$ and 35 g of an organopolysiloxane having an average molecular weight of 2,100 and the compositional formula $(HMe_2SiO_{1/2})_{0.5}(SiO_2)_{0.5}$ were mixed. Into the resulting mixture were thoroughly mixed 2 mg 2-methyl-3-butyn-2-ol as cure-rate regulator and, as curing catalyst, 1 mg as platinum metal of toluene solution of tris(tetramethyldivinyldisiloxane)diplatinum(0). The mixture was degassed under reduced pressure, poured into a 5×5×50 mm mold and heated at 80° C. for 1 hour while pressed. The cured sample was removed from the mold and subsequently subjected to a secondary cure for an additional 3 hours in a 150° C. oven. The cured product thus obtained had a flexural modulus of 370 MPa.

Example 2

50 g of an organopolysiloxane having an average molecular weight of 1,800 and the compositional formula $(ViMe_2SiO_{1/2})_{0.25}(Me_3SiO_{1/2})_{0.25}(SiO_2)_{0.5}$ and 35 g of an organopolysiloxane having an average molecular weight of 1,600 and the compositional formula $(HMe_2SiO_{1/2})_{0.25}(Me_3SiO_{1/2})_{0.25}(SiO_2)_{0.5}$ were mixed. Into the resulting mixture were thoroughly mixed 5 mg methyltris(1,1-dimethyl-2-propynoxy)silane as cure-rate regulator and, as curing catalyst, 2 mg as platinum metal of a toluene solution of tris(tetramethyldivinyldisiloxane)di-platinum(0). The mixture was degassed under reduced pressure and injected using an injection molder into a mold heated to 100° C. The cured sample was removed from the mold and subsequently subjected to a secondary cure for an additional 3 hours in a 150° C. oven. The cured product thus obtained had a flexural modulus of 260 MPa.

Example 3

50 g of an organopolysiloxane having an average molecular weight of 1,600 and the compositional formula $(ViMe_2SiO_{1/2})_{0.55}(SiO_2)_{0.45}$ and 40 g of an organopolysiloxane having an average molecular weight of 2,100 and the compositional formula $(HMe_2SiO_{1/2})_{0.5}(SiO_2)_{0.5}$ were mixed. Using a roll mill, this mixture was blended with 15 g of a dry-process silica having a specific surface of 200 m$^2$/g whose surface had been treated with hexamethyldisilazane. Into the resulting mixture were thoroughly mixed 2 mg 2-methyl-3-butyn-2-ol as cure-rate regulator and, as curing catalyst, 15 mg as platinum metal of an isopropanol solution of chloroplatinic acid. The mixture was degassed under reduced pressure, poured into a 5×5×50 mm mold and heated at 100° C. for 1 hour while pressed. The cured sample was removed from the mold and subsequently subjected to a secondary cure for an additional 1 hour in a 200° C. oven. The cured product thus obtained had a flexural modulus of 1,090 MPa.

The silicate structure-containing curable organopolysiloxane composition of the present invention exhibits a high modulus of elasticity and is useful for application as various types of coatings and substrates.

We claim:

1. A curable organopolysiloxane composition that consists essentially of:

(A) a first organic solvent-soluble organopolysiloxane comprising $R^1_3SiO_{1/2}$ units and $SiO_{4/2}$ units where the sum of these units makes up at least 80 mole % of the first organopolysiloxane, each $R^1$ independently denotes a monovalent organic group and at least two of the $R^1_3SiO_{1/2}$ units in each molecule contains an alkenyl group having no more than 10 carbons;

(B) a second organic solvent-soluble organopolysiloxane comprising $R^2_3SiO_{1/2}$ units and $SiO_{4/2}$ units where the sum of these units makes up at least 80 mole % of the second organopolysiloxane, each $R^2$ independently represents a hydrogen atom or a monovalent organic group and each molecule contains at least two $R^2_3SiO_{1/2}$ units in which at least one $R^2$ is hydrogen; and (C) a platinum catalyst, and has a post-cure flexural modulus of at least 100 MPa.

2. The curable organopolysiloxane composition of claim 1, wherein $R^1$ is a halogen substituted or unsubstituted hydrocarbon group or an alkenyl group.

3. The curable organopolysiloxane composition of claim 2, wherein $R^1$ is a vinyl, allyl, hexenyl, methyl or phenyl group.

4. The curable organopolysiloxane composition of claim 3, wherein $R^2_3SiO_{1/2}$ is $(CH_3)_2HSiO_{1/2}$.

5. The curable organopolysiloxane composition of claim 4, wherein the $SiO_{4/2}$ unit-to-$R^1_3SiO_{1/2}$ unit ratio in the first organopolysiloxane is 0.3 to 3.0.

6. The curable organosiloxane composition of claim 5, wherein the molar ratio of SiH in the second organopolysiloxane to the alkenyl group in the first organopolysiloxane is 1/5 to 5/1.

7. The curable organopolysiloxane composition of claim 6, wherein the molar ratio of platinum metal based on total alkenyl groups in the first organopolysiloxane is 1/100,000 to 1/100.

* * * * *